United States Patent
Terry et al.

(10) Patent No.: US 7,764,642 B2
(45) Date of Patent: *Jul. 27, 2010

(54) METHOD FOR DISTRIBUTION OF WIRELESS TRANSMIT/RECEIVE UNIT (WTRU) CAPABILITY BETWEEN POINT TO POINT AND POINT TO MULTIPOINT SERVICES

(75) Inventors: Stephen E. Terry, Northport, NY (US); James M. Miller, Verona, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 1005 days.

This patent is subject to a terminal disclaimer.

(21) Appl. No.: 11/080,580

(22) Filed: Mar. 15, 2005

(65) Prior Publication Data

US 2005/0157666 A1 Jul. 21, 2005

Related U.S. Application Data

(63) Continuation of application No. 10/729,675, filed on Dec. 5, 2003, now Pat. No. 6,909,703.

(60) Provisional application No. 60/446,716, filed on Feb. 11, 2003.

(51) Int. Cl.
*H04W 4/00* (2009.01)
(52) U.S. Cl. .................. 370/328; 370/338; 370/352; 370/401
(58) Field of Classification Search .............. None
See application file for complete search history.

(56) References Cited

U.S. PATENT DOCUMENTS 6,374,112 B1  4/2002  Widegren et al.
6,701,155 B2  3/2004  Sarkkinen et al.
6,898,429 B1 *  5/2005  Vialen et al. ............. 455/432.1
6,909,703 B2 *  6/2005  Terry et al. ................. 370/328
6,996,401 B2  2/2006  Agin
7,031,277 B2 *  4/2006  Choi et al. .................. 370/331

(Continued)

FOREIGN PATENT DOCUMENTS

JP    2002-094562    3/2002

(Continued)

OTHER PUBLICATIONS

3GPP: "3$^{rd}$ Generation Partnership Project; Technical Specification Group Radio Access Network; Introduction of the Multimedia Broadcast Mutlicast Service (MBMS) in the Radio Access Network (Stage-2); (Release 6); 3GPP TS 25.346 V1.3.0" Jan. 2003, pp. 1-11.

(Continued)

*Primary Examiner*—Michael J Moore, Jr.
(74) *Attorney, Agent, or Firm*—Volpe and Koenig, P.C.

(57) ABSTRACT

Method and apparatus for arranging wireless transmit/receive unit (WTRU) capability distribution between point to point (PtP) and point to multipoint (PtM) services. The method addresses PtP/PtM specific and common capabilities shared between PtM and PtP. The method utilizes procedures and different scenarios to coordinate establishment/release of PtP and PtM services and distribution of WTRU PtP/PtM capabilities within a universal mobile telecommunication system terrestrial radio access network (UTRAN).

13 Claims, 3 Drawing Sheets

U.S. PATENT DOCUMENTS

| | | | |
|---|---|---|---|
| 7,433,334 | B2 | 10/2008 | Marjelund et al. |
| 2002/0090940 | A1 | 7/2002 | Chen et al. |
| 2003/0207696 | A1 | 11/2003 | Willeneger et al. |
| 2004/0081192 | A1 | 4/2004 | Koulakiotis et al. |
| 2004/0127243 | A1 | 7/2004 | Sarkkinen |
| 2004/0137885 | A1 | 7/2004 | Sarkkinen et al. |

FOREIGN PATENT DOCUMENTS

| | | |
|---|---|---|
| WO | 2004/028174 | 4/2004 |

OTHER PUBLICATIONS

TSG-RAN Working Group 2 (Radio Layer 2 and Radio Layer 3): "Additions to RRC procedures related to UE capabilities", Apr. 1999, pp. 1-3.

TSG-RAN Working Group 2 (Radio Layer 2 and Radio Layer 3): "Results from the RRC procedures and ad-hoc group", May 1999, pp. 1-15.

Third Generation Partnership Project, "Technical Specification Group Radio Access Network; Introduction of the Multimedia Broadcast Mutlicast Service (MBMS) in the Radio Access Network (Stage-2)" (Release 6), 3GPP TS 25.346 v1.3.0 Jan. 2003, pp. 1-11.

Third Generation Partnership Project, "Technical Specification Group Radio Access Network; Introduction of the Multimedia Broadcast Mutlicast Service (MBMS) in the Radio Access Network (Stage-2)" (Release 6), 3GPP TS 25.346 v6.3.0, Dec. 2004.

TSG-RAN Working Group 2 (Radio Layer 2 and Radio Layer 3): "Additions to RRC procedures related to UE capabilities", Apr. 1999, pp. 1-3.

TSG-RAN Working Group 2 (Radio Layer 2 and Radio Layer 3): "Results from the RRC procedures and ad-hoc group", May 1999, pp. 1-15.

Wi Editor (Nokia), "3GPP TS 25.346 1.3.0: Introduction of the Multimedia Broadcast Mutlicast Service (MBMS) in the Radio Access Network (Stage-2)," 3GPP TSG RAN WG2/WG3 MBMS AdHoc, R2-0300xx (Wokingham, UK, Jan. 15-16, 2003).

Third Generation Partnership Project, "Technical Specification Group Radio Access Network; Introduction of the Multimedia Broadcast Mutlicast Service (MBMS) in the Radio Access Network (Stage-2)" (Release 6), 3GPP TS 25.346 v1.3.0 Jan. 2003, pp. 1-11.

Third Generation Partnership Project, "Technical Specification Group Radio Access Network; Introduction of the Multimedia Broadcast Mutlicast Service (MBMS) in the Radio Access Network (Stage-2)" (Release 6), 3GPP TS 25.346 v6.3.0, Dec. 2004.

TSG-RAN Working Group 2 (Radio Layer 2 and Radio Layer 3): "Additions to RRC procedures related to UE capabilities", Apr. 1999, pp. 1-3.

TSG-RAN Working Group 2 (Radio Layer 2 and Radio Layer 3): "Results from the RRC procedures and ad-hoc group", May 1999, pp. 1-15.

Wi Editor (Nokia), "3GPP TS 25.346 1.3.0: Introduction of the Multimedia Broadcast Mutlicast Service (MBMS) in the Radio Access Network (Stage-2)," 3GPP TSG RAN WG2/WG3 MBMS AdHoc, R2-0300xx (Wokingham, UK, Jan. 15-16, 2003).

* cited by examiner

METHOD FOR DISTRIBUTION OF WIRELESS TRANSMIT/RECEIVE UNIT (WTRU) CAPABILITY BETWEEN POINT TO POINT AND POINT TO MULTIPOINT SERVICES

CROSS REFERENCE TO RELATED APPLICATION(S)

This application is a continuation of U.S. patent application Ser. No. 10/729,675, filed Dec. 5, 2003, now U.S. Pat. No. 6,909,703, which in turn claims priority from U.S. Provisional Patent Application Ser. No. 60/446,716, filed Feb. 11, 2003, which are incorporated by reference as if fully set forth.

FIELD OF INVENTION

This invention generally relates to wireless transmit/receive unit (WTRU) capability, and more particularly to a method for distribution of WTRU capability between point to point (PtP) and point to multipoint (PtM) services.

BACKGROUND

It is generally known that WTRU capabilities identify transport and physical processing abilities. Transport capabilities define transport channel attributes such as the number of transmitted bits per frame, the number of different combinations of bits allowed, and other similar parameters. Physical capabilities define the number and types of physical channels including parameters such as allowed spreading factors and other similar parameters.

For PtP services, it is noted that radio bearers (RBs) are controlled by the serving radio network controller (S-RNC). The S-RNC coordinates RB establishment, data transmission, release and maintenance of the quality of service (QoS).

In advance of establishment of PtP RBs, the WTRU signals its capabilities to the S-RNC. Physical resources are determined by the controlling RNC (C-RNC) and, for proper determination of physical resources, the S-RNC then relays the capability information to the C-RNC.

For PtM services, RBs are managed by the C-RNC. Similar to the PtP case, the C-RNC coordinates establishment, transmission, and release of PtM RBs. For proper configuration of PtM transport and physical channels, it is necessary to know the PtM capabilities of the WTRU associated with the PtM service. It is therefore necessary to define procedures that provide this information to the C-RNC.

Since PtP and PtM services can exist simultaneously, it is necessary to coordinate transmission of these services so that WTRU capabilities are used efficiently and not exceeded.

Some WTRUs will not have the capability to receive both PtP and PtM services simultaneously, and other WTRUs will have to distribute capabilities between these service types. It is therefore necessary and desirable to coordinate the assignment of WTRU capabilities between the PtP and PtM services. Additionally, since PtP services are managed by the S-RNC and PtM services are managed by the C-RNC, it is desirable to have procedures in place to coordinate the use of WTRU capabilities between the two aforementioned types of RNCs.

SUMMARY

The invention provides a method of arranging WTRU capability distribution between PtP and PtM services, and describes different scenarios to coordinate establishment and distribution of WTRU PtP/PtM capabilities within a Universal Mobile Telecommunication System Terrestrial Radio Access Network (UTRAN), as an example. The invention also provides different scenarios for management of PtP/PtM services to enhance efficiencies of a communications network providing PtP and PtM services not heretofore obtainable employing conventional techniques.

PtM/PtP specific or common capabilities shared between PtM and PtP include:

To coordinate WTRU capabilities between PtM and PtP services, independent capabilities may be identified specific for each service. New PtM capabilities are added to the existing PtP capabilities. To limit the number of PtP/PtM combinations, an index can be specified to indicate certain preferred combinations of PtM and PtP capabilities.

An indicator may also be specified in WTRU capabilities if both PtM and PtP services can be received simultaneously or not. In the case where PtM and PtP cannot be received simultaneously, the PtM and PtP independent capabilities are mutually exclusive lists.

In the case of common PtM and PtP capabilities that are shared between PtP and PtM services, the S-RNC and C-RNC coordinate the distribution of capabilities between PtP and PtM services. When simultaneous support of PtP and PtM services is not indicated, the WTRU capabilities are dedicated either to the PtP or PtM service.

Exemplary procedures to coordinate establishment of PtP and PtM services and distribution of WTRU PtP/PtM capabilities within a UTRAN include:

In accordance with existing procedures, the S-RNC is informed of WTRU PtP and PtM capabilities upon establishment of a Radio Resource Control (RRC) Radio Access Network (RAN) connection. This embodiment of the invention provides mechanisms for identifying WTRU capabilities to the C-RNC that are available for PtM services. Additionally, procedures are defined for coordination of WTRU PtP and PtM capabilities between S-RNCs and C-RNCs when both services are active simultaneously and may establish or release asynchronously relative to each other.

The C-RNC is informed of either PtP/PtM common or PtM specific WTRU capabilities upon WTRU entry to any cell controlled by this C-RNC. This can be accomplished with modification to the existing cell update procedure when the WTRU does not have an active dedicated PtP service, with modification to the radio link (RL) Setup procedure when a dedicated PtP service exists, and/or with an additional new procedure initiated by the C-RNC upon activation of the PtM service.

When the WTRU does not already have an established, dedicated PtP service, each time the WTRU enters a new cell or a PtM distribution area comprising more than one cell, the WTRU will initiate the existing cell update procedure. The purpose for the existing cell update procedure is to update the WTRU location and correspondingly update UTRAN routing to establish a new transmission path to the WTRU. Upon receipt of the cell update, the S-RNC determines if the WTRU has an activated PtM service and, if so, returns the PtM WTRU capability in the cell update confirmation to the C-RNC. Alternatively, the PtM WTRU capability information is provided to the C-RNC as a separate message (i.e., service activation/PtM RB setup). In either case, it is the cell update procedure that triggers the PtM capability to be signaled to the C-RNC.

BRIEF DESCRIPTION OF THE DRAWINGS

A more detailed understanding of the invention may be had from the following description of preferred embodiments, given by way of example and to be understood in conjunction with the accompanying drawings in which like elements are designated by like numerals and wherein.

DETAILED DESCRIPTION OF THE PREFERRED EMBODIMENT(S)

Figure 1:
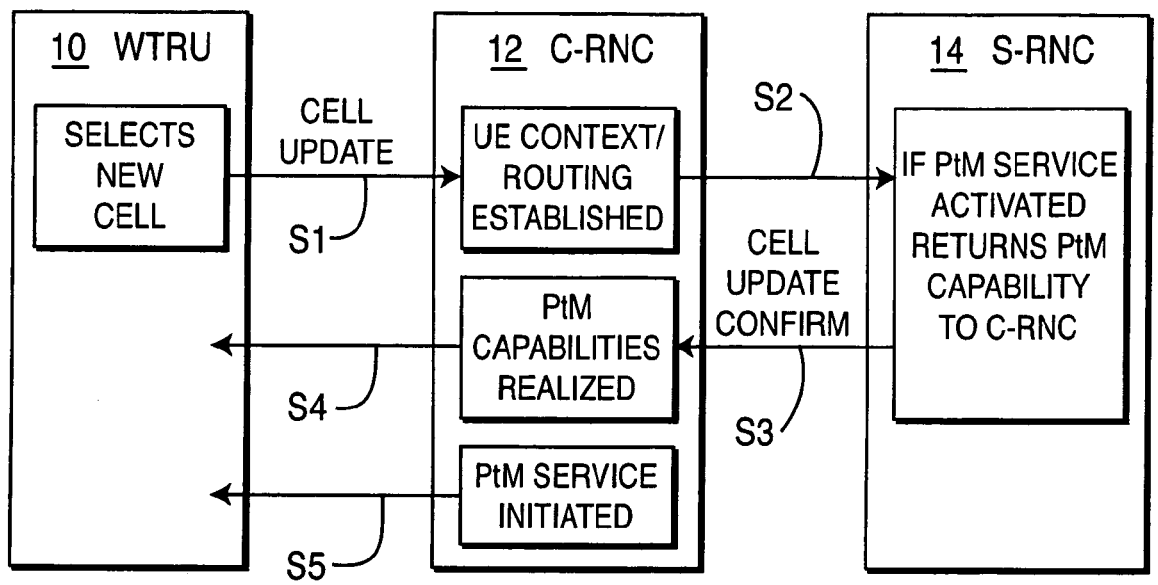
FIG. 1 illustrates a PtM WTRU capability procedure when entering a new cell, when no dedicated PtP service exists.
Figure 2:
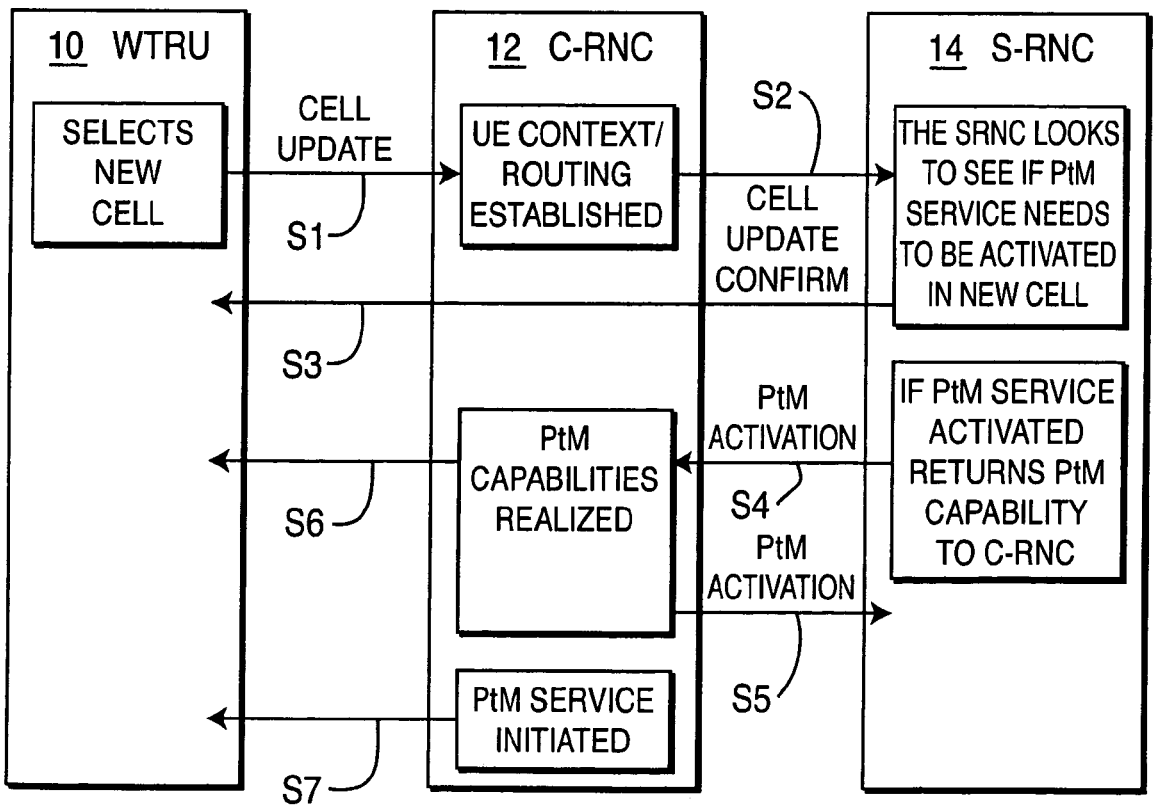
FIG. 2 illustrates a scenario similar to that in FIG. 1, but including activation by a separate procedure.
Figure 3:
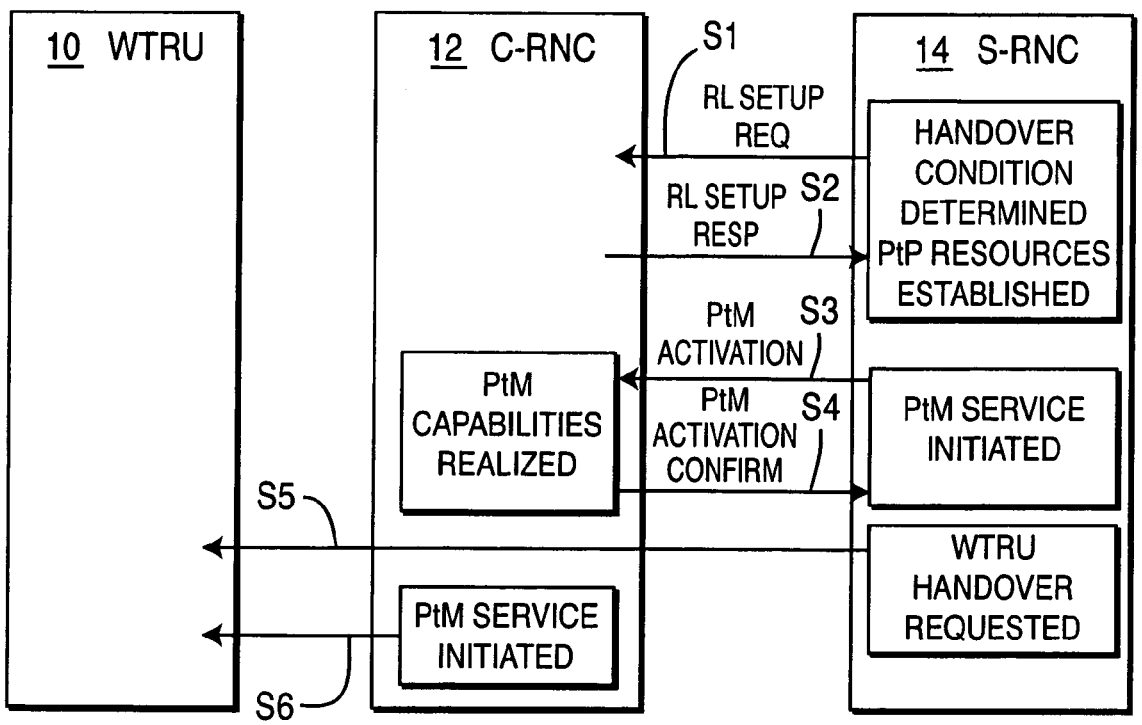
FIG. 3 is an illustration of the PtM WTRU capability procedure upon dedicated PtP establishment and handover to cells controlled by another C-RNC with a separate procedure to establish PtM service.
Figure 4:
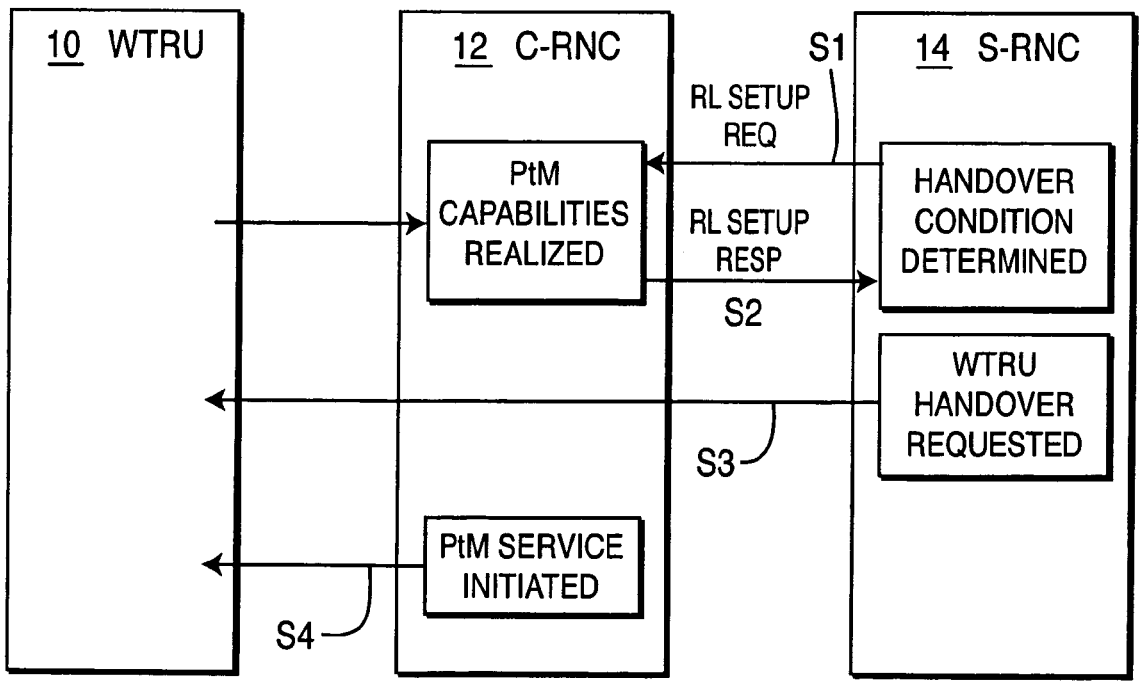
FIG. 4 is an illustration of the PtM WTRU capability upon dedicated PtP establishment and handover to cells controlled by another C-RNC with a single procedure.
Figure 5:
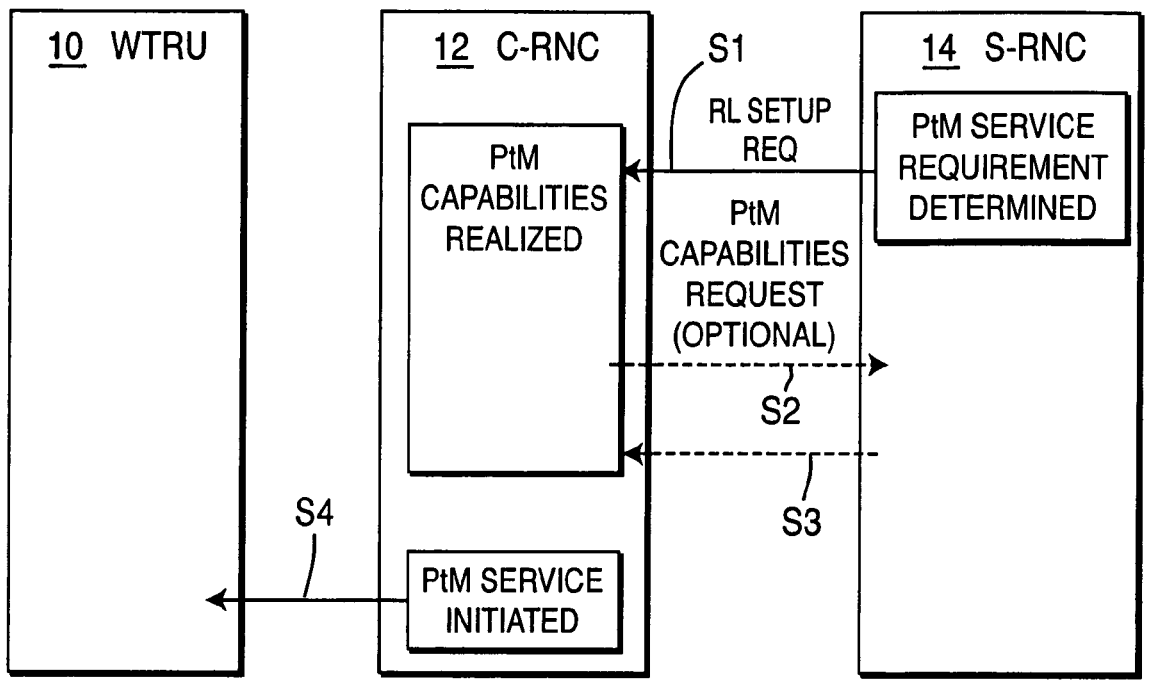
FIG. 5 is an illustration of WTRU capabilities in PtM activation with an optional subsequent capability request procedure.
Figure 6:
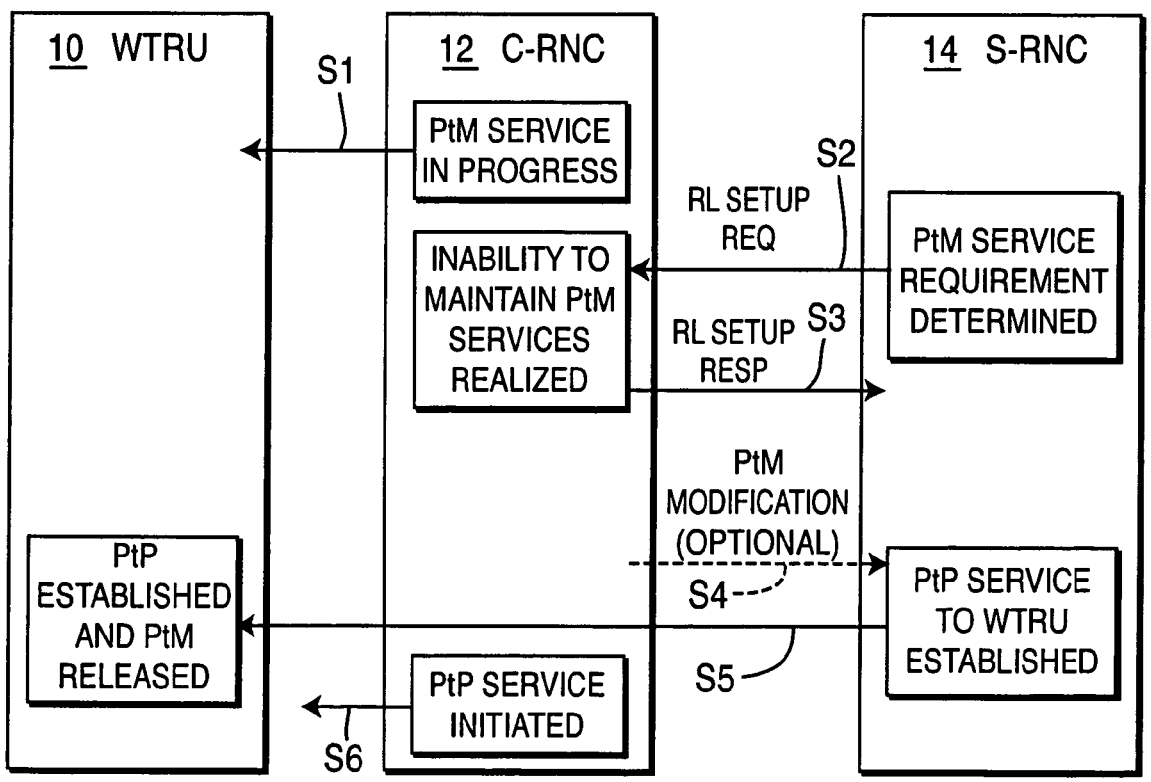
FIG. 6 shows an illustration of PtM services upon PtP establishment when WTRU capabilities do not allow for simultaneous PtP/PtM support.

Although the features and elements of the present invention are described in the preferred embodiments in particular combinations, each feature or element can be used alone (without the other features and elements of the preferred embodiments) or in various combinations with or without other features and elements of the present invention.

Hereafter, a wireless transmit/receive unit (WTRU) includes but is not limited to a user equipment, mobile station, fixed or mobile subscriber unit, pager, or any other type of device capable of operating in a wireless environment. When referred to hereafter, a base station includes but is not limited to a Node-B, site controller, access point or any other type of interfacing device in a wireless environment.

What is claimed is:

1. A method employed by a controlling radio network controller (C-RNC) for providing point to point (PtP) and point to multipoint (PtM) services, comprising:
    receiving communication capabilities of a wireless transmit receive unit (WTRU);
    conveying communication capabilities of the WTRU to a serving radio network controller (S-RNC);
    communicating to the S-RNC a desired service requested by the WTRU;
    receiving allocations from the S-RNC regarding the desired service; and
    providing the desired service to the WTRU employing capabilities received from the S-RNC.

2. The method of claim 1 wherein the C-RNC provides PtM services to the WTRU.

3. The method of claim 1 wherein the C-RNC provides PtP services to the WTRU.

4. The method of claim 3 wherein the C-RNC activates PtM service to the WTRU simultaneously with PtP service responsive to allocations received from the S-RNC.

5. The method of claim 4 wherein the C-RNC reduces the PtP service capabilities to provide simultaneous PtP and PtM services responsive to an allocation provided by the S-RNC.

6. The method of claim 4 wherein the C-RNC maintains present PtP and PtM service capabilities responsive to a communication from the S-RNC that no change be made in the PtP capabilities based upon WTRU capabilities which are sufficient to enable PtM service without reduction in the PtP service.

7. The method of claim 1 wherein the desired service provided to the WTRU by the C-RNC comprises PtP service;
    the C-RNC activating PtM service and terminating PtP service responsive to a request from the S-RNC and based on allocations provided by the S-RNC.

8. The method of claim 1 wherein the service provided to the WTRU by the C-RNC is PtP service; and
    the C-RNC denies PtM service to the WTRU simultaneously with PtP service based upon the allocations provided by the S-RNC.

9. A method in a controlling radio network controller (C-RNC) for activation and distribution of point to point (PtP) and point to multipoint (PtM) capabilities in wireless communications comprising;
    receiving a cell update from a WTRU identifying capabilities of the WTRU;
    providing the cell update to a serving radio network controller (S-RNC);
    receiving confirmation of the cell update of the WTRU from the S-RNC; and
    activating PtM service operating at a capability obtained from the S-RNC.

10. The method of claim 9 further comprising initiating PtM service to the WTRU employing capabilities allocated by the S-RNC of the one cell.

11. The method of claim 9 further comprising allocating PtP and PtM services according to the WTRU capabilities to enable PtP and PtM services to be performed simultaneously.

12. The method of claim 9 further comprising stopping PtP services while providing PtM services, according to capabilities of the WTRU.

13. The method of claim 9 further comprising communicating a cell update from the WTRU to the S-RNC and confirming a cell update directly to the WTRU responsive to receipt of a cell update from the S-RNC.

* * * * *

UNITED STATES PATENT AND TRADEMARK OFFICE
CERTIFICATE OF CORRECTION

| | |
|---|---|
| PATENT NO. | : 7,764,642 B2 |
| APPLICATION NO. | : 11/080580 |
| DATED | : July 27, 2010 |
| INVENTOR(S) | : Terry et al. |

It is certified that error appears in the above-identified patent and that said Letters Patent is hereby corrected as shown below:

ON THE TITLE PAGE

At section (56) U.S. PATENT DOCUMENTS, page 2, left column, line 3, after "11/2003", delete "Willeneger et al." and insert therefor --Willenegger et al.--.

Signed and Sealed this
Twenty-sixth Day of April, 2011

David J. Kappos
*Director of the United States Patent and Trademark Office*